P. ECKENROTH.
VALVE.
APPLICATION FILED JULY 2, 1917.
1,357,767.
Patented Nov. 2, 1920.
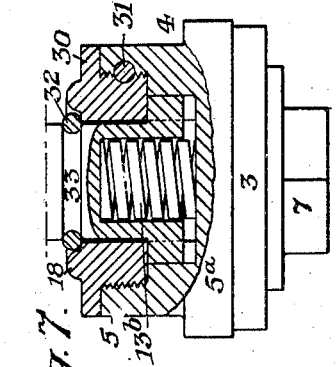
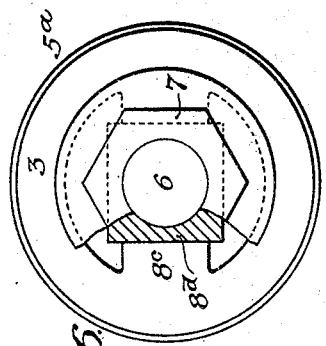
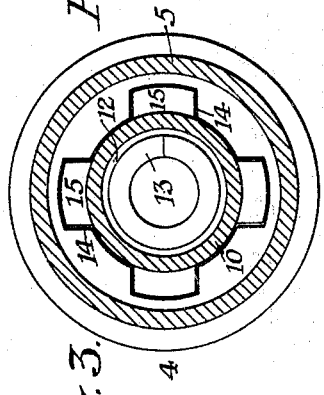
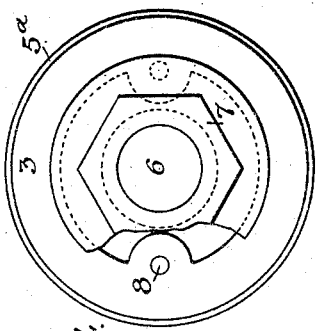
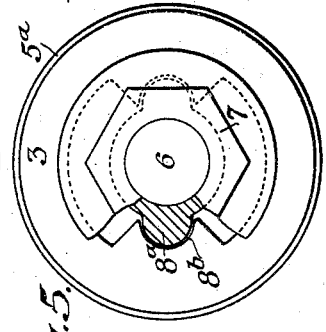
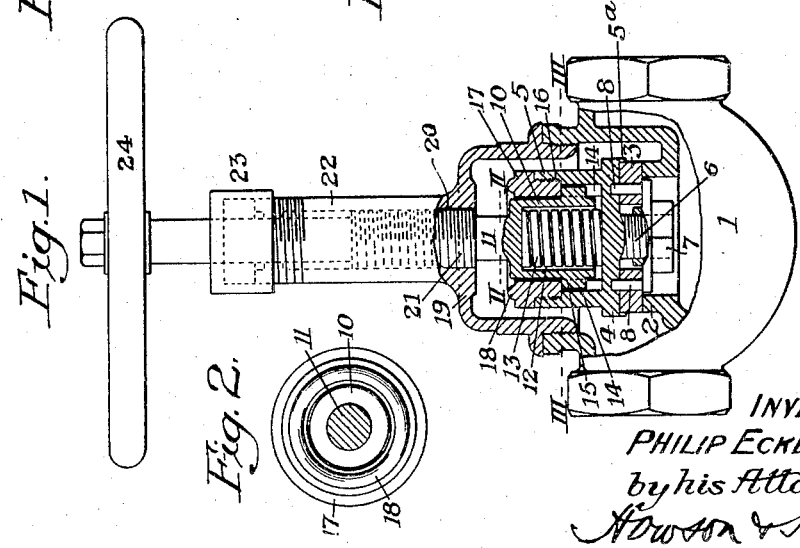
INVENTOR:
PHILIP ECKENROTH,
by his Attorneys,
Howson & Howson

UNITED STATES PATENT OFFICE.

PHILIP ECKENROTH, OF PHILADELPHIA, PENNSYLVANIA, ASSIGNOR OF SIX TWENTY-FIFTHS TO WILBUR F. HAMILTON, OF CYNWYD, PENNSYLVANIA, AND SIX TWENTY-FIFTHS TO FRANK J. MILON, OF WILLIAM PENN, PENNSYLVANIA.

VALVE.

1,357,767.   Specification of Letters Patent.   Patented Nov. 2, 1920.

Application filed July 2, 1917. Serial No. 178,280.

*To all whom it may concern:*

Be it known that I, PHILIP ECKENROTH, a citizen of the United States, residing in Philadelphia, Pennsylvania, have invented certain Improvements in Valves, of which the following is a specification.

My invention relates to valves of the "globe" type, and my present invention consists of improvements in the means employed for seating the valves, whereby I am enabled to provide for rotation of the same after the valve has been seated. In my improved valve structure, cushioning means are interposed between the valve-operating means and the valve or valve member, and the means for accomplishing this result may be located within a special form of valve member. For the cushioning means, I may employ coiled springs or flat springs or other approved cushioning means or a combination of both.

These and other features of my invention are more fully described hereinafter, reference being had to the accompanying drawings, in which:

Figure 1, is a sectional elevation of one form of valve within the scope of my invention.

Figs. 2 and 3, are sectional plan views on the lines II—II and III—III, respectively, Fig. 1.

Fig. 4, is an inverted plan view of the valve member.

Figs. 5 and 6, are similar views illustrating modified constructions within the scope of my invention, and Fig. 7, is a view illustrating a modified detail of construction within the scope of my invention.

In Fig. 1, of the drawings, 1 represents a valve casing which may be of the usual globe type, having a seat 2 which may be of usual construction and with which a renewable valve disk 3 of the valve member 4 engages. The valve member 4 is of a special construction having, in the present instance, an annular wall or flange 5, and a centrally depending threaded stem 6, to which a nut 7 is adapted; said nut underlying said disk 3 and holding the same in engagement with the valve member 4. The valve disk 3 may be held in fixed position with reference to the valve member 4 by suitable means. For instance I may employ pins 8, or the valve disk may have its inner wall shaped to engage lugs or other surfaces carried by the lower part of the valve member adjacent the stem 6. If desired, the lower part of the outer wall of the valve member may be flanged as at 5$^a$ to embrace the valve disk. If desired, the nut 7 may be pinned to the stem 6 so as to occupy a fixed position with reference to the valve disk.

Adapted to a hollow chamber formed by the flange 5 of the valve member is the end 10 of a valve stem 11, which end 10 is hollow, as indicated at 12, and receives a spring 13 interposed between the same and the bottom of the valve member. The inner wall of the flange 5 of the latter may be grooved at 14 for the reception of lugs 15 carried by the end of the valve stem, so that these parts may be coupled to turn together, and said end of the valve stem has limited vertical movement within the chamber of the valve member for a purpose to be described. If desired, the end of the valve stem may be grooved to engage lugs formed on the inner wall of the flange of the valve member. The upper part of the valve member is threaded at 16 for the reception of a collar 17 whereby the end of the valve stem may be held to said valve member, and this collar 17 may have a portion 18 adapted to seat on the under surface of the bonnet when the structure is placed in position to have the valve stem packed by raising the valve member.

The valve casing 1 is provided with a bonnet 19, threaded at 20, for the threaded portion 21, of the valve stem, and having at the upper end a sleeve 22 receiving a bonnet 23 which may inclose suitable packing for said stem; the usual hand-wheel or lever 24 being provided whereby said stem may be turned.

By reason of the spring interposed between the end of the valve stem and the valve, a certain amount of movement between the parts is provided for, and this may be sufficient to permit movement of the valve disk upon its seat approximately one full turn before it finally is rigidly seated in place. In such action a certain amount of grinding is effected which keeps the seat in proper working condition at all times.

In Fig. 4, I have shown an inverted view of the valve member, in which pins 8 are employed to hold the valve disk fixed relative to the valve member. In lieu of this the latter may be provided with lugs 8ª, as shown in Fig. 5, engaging sockets 8ᵇ formed in the valve disk, or said valve disk may have a squared shoulder 8ᶜ and the valve member have squared sides 8ᵈ to engage the same as shown in Fig. 6. This valve disk is renewable to take care of wear upon the same.

In Fig. 7, I have shown the application to an ordinary valve head, of a stem with a T-shaped head arranged to fit a socket in the valve head; being held in place by a threaded collar 30 which may also be secured by a cotter pin or set screw 31. This collar may carry an annular projection 18 to seat on the under side of the bonnet when it is desired to pack the valve stem. The end of the valve stem is recessed for the reception of a spring 13ᵇ, as in the other structures referred to, and the stem may carry a compressible gasket 32 seated in an annular recess 33 of the same and serving to hold the valve member in such relation to the valve stem that the valve disk will be initially held to its seat by the gasket.

In all of the structures illustrated, I employ a detachable valve disk of the character illustrated in Figs. 1, 3, 4, *et seq.*, which is held against turning, and may be secured to the valve member by the nut 7, or in any other suitable manner.

I claim:

In a valve structure, the combination of a casing having the usual apertured partition, with an upstanding wall surrounding said aperture and forming a valve seat, a hollow valve member within said casing axially mounted with respect to said seat and having a depending screw-threaded stem, a removable valve disk carried by said hollow valve member and surrounding said depending stem for flat engagement with said seat, means for holding said valve disk against turning with respect to the hollow valve member, a nut adapted to said stem for securing the valve disk to the under side of said hollow valve member, a valve stem having an enlarged lower end slidably fitting the interior of said hollow valve member; said end being recessed, lugs carried by said enlarged end of the valve stem for engagement with vertical grooves formed in the inner wall of said hollow valve member whereby the latter may be turned by said valve stem, and a spring within the recessed end of the valve stem and disposed between the same and the bottom wall of the hollow valve member; said valve stem having limited vertical movement with respect to the hollow valve member so that the latter may be turned with the valve disk engaging the seat after said valve disk contacts therewith.

PHILIP ECKENROTH.